United States Patent
Smid et al.

(10) Patent No.: US 7,727,298 B2
(45) Date of Patent: Jun. 1, 2010

(54) ADJUSTABLE DUAL-BLADE DUST FILTER USING GRANULAR BED FLOW

(75) Inventors: Jiri Smid, Jhongli (TW); Shu-San Hsiau, Taipei (TW); Chin-Ching Tzeng, Yonghe (TW); Yi-Shun Chen, Taipei (TW); Chia-Ren Hsu, Dounan Township, Yunlin County (TW); Yuh-Jenq Yu, Longtan Township, Taoyuan County (TW)

(73) Assignee: Atomic Energy Council, Taoyuan (TW)

( * ) Notice: Subject to any disclaimer, the term of this patent is extended or adjusted under 35 U.S.C. 154(b) by 271 days.

(21) Appl. No.: 11/708,139

(22) Filed: Feb. 20, 2007

(65) Prior Publication Data
US 2008/0196365 A1  Aug. 21, 2008

(51) Int. Cl.
*B01D 46/32* (2006.01)

(52) U.S. Cl. .............................. 55/474; 55/479; 95/110; 95/275; 96/150

(58) Field of Classification Search .................. 55/307, 55/308, 418, 474, 479; 95/108, 110, 274, 95/275, 107; 422/213, 216; 96/150
See application file for complete search history.

(56) References Cited

U.S. PATENT DOCUMENTS

| | | | | |
|---|---|---|---|---|
| 3,708,981 A * | 1/1973 | Johswich et al. | .............. | 95/110 |
| 3,716,969 A * | 2/1973 | Maeda | ......... | 96/150 |
| 3,800,508 A * | 4/1974 | Zenz | ............ | 95/276 |
| 4,299,598 A * | 11/1981 | Dutkiewicz | .................. | 95/275 |
| 4,333,751 A * | 6/1982 | Iwamura et al. | ............... | 96/150 |
| 4,670,226 A * | 6/1987 | Furuyama et al. | ........... | 422/216 |
| 4,744,804 A * | 5/1988 | Furuyama et al. | ............. | 95/111 |
| 5,238,659 A * | 8/1993 | Tajiri et al. | .................. | 422/216 |
| 6,440,198 B1 * | 8/2002 | Yang et al. | .................... | 95/275 |
| 6,783,572 B1 * | 8/2004 | Squires | ......... | 95/274 |
| 7,132,088 B2 * | 11/2006 | Smid et al. | .................. | 422/176 |
| 7,476,364 B2 * | 1/2009 | Peng et al. | .................. | 422/168 |

* cited by examiner

*Primary Examiner*—Michael A Marcheschi
*Assistant Examiner*—Robert A Clemente
(74) *Attorney, Agent, or Firm*—Jackson IPG PLLC

(57) ABSTRACT

A dust filter has adjustable sub-blades between blades. By adjusting the blades distanced and the sub-blades' positions and angles, stagnation area of filtration material on the blades are removed. Furthermore, space in the dust filter is fully used. Thus, a filtering efficiency is improved.

3 Claims, 13 Drawing Sheets

| Assembly | Blade distance (mm) | Sub-blade length (mm) | Sub-blade angle (°) |
|---|---|---|---|
| 5A | 340 | -- | -- |
| 5B | 260 | 160 | 20 |
| 5C | 260 | 160 | 22 |
| 5D | 260 | 160 | 25 |
| 5E | 260 | 160 | 30 |
| 5F | 520 | 160 | 22 |
| 5G | 340 | 160 | 25 |

FIG.6

ADJUSTABLE DUAL-BLADE DUST FILTER USING GRANULAR BED FLOW

FIELD OF THE INVENTION

The present invention relates to a dust filter; more particularly, relates to filtering out dust in exhaust gas with adjustable sub-blades to obtain a best filtering efficiency.

DESCRIPTION OF THE RELATED ARTS

There are two factors which affect filtration material flow in a dust filter: one is an angle of friction between granules and a wall surface of a flow field, called an angle of wall friction; and another one is an angle of friction between every two granules, called an angle of internal friction. In one hand, a flow factor decides a flow capacity of granules in a hopper. To acquire a value of the flow factor for a filtration material, a test has to be done to obtain the angle of wall friction of the filtration material. Then, an angle for a blade at an inlet to a vertical line is decided. In another hand, the flow capacity of granules is expressed as a flow function. Granules flowing easily have a small value of the flow function; on the contrary, harder flowing granules, a higher value. For example, after the filtration material is pressed for a long time, the granule arrangement becomes too tight to flow easily, which results in a high value of the flow function.

An issue concerning a prior art is shown in FIG. 7. The prior art has no sub-blade, so that granules with contaminants obstruct a filtering bed and reduce an efficiency on using the filtering bed, where the area obstructed includes a semi-motionless area 32 and a motionless area 31.

Another prior art, called "a movable granular bed", comprises a gas-intake-side guiding plate for introducing a gas into a granular bed; a gas-exhaust-side blade for exhausting the gas out of the granular bed; and a vertically-aligned flow corrective unit, each located in a middle position between two guiding plates of the gas-intake-side blade and the gas-exhaust-side blade separately. With the design of the gas-intake-side blade, the gas-exhaust-side blade and the flow corrective unit, the prior art avoid stagnation of filtration material on the blades and thus further avoid corrosion and obstruction on the blades.

Although the "movable granular bed" avoids the stagnation of the filtration material on the blades, the design of the flow corrective unit has a smaller upper mouth and a wider lower mouth, so that there is a space below the flow corrective unit which is not filled with the filtration material and is thus wasted. Hence the prior arts do not fulfill users' requests on actual use.

SUMMARY OF THE INVENTION

The main purpose of the present invention is to find a best flow of filtration material by a design of sub-blade in a granular bed, where the filtration material is fully filled in a bed space and a stagnation area of filtration material on blades are totally removed.

To achieve the above purpose, the present invention is an adjustable dual-blade dust filter using a granular bed flow, comprising a filtration material inlet, a gas intake blade, a gas intake sub-blade, a gas exhaust blade, a gas exhaust sub-blade, and a filtration material outlet, where a granular bed material is flowed in the dust filter; the gas intake sub-blade and the gas exhaust sub-blade are deposed in a frame for the granular bed material to remove a stagnation are a of filtration material to improve filtering efficiency of the filtration material. Accordingly a novel adjustable dual-blade dust filter using a granular bed flow is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

FIG. 6 is the view showing the parameters of the dust filters; and

DESCRIPTION OF THE PREFERRED EMBODIMENT

The following description of the preferred embodiment is provided to understand the features and the structures of the present invention.

Figure 1:
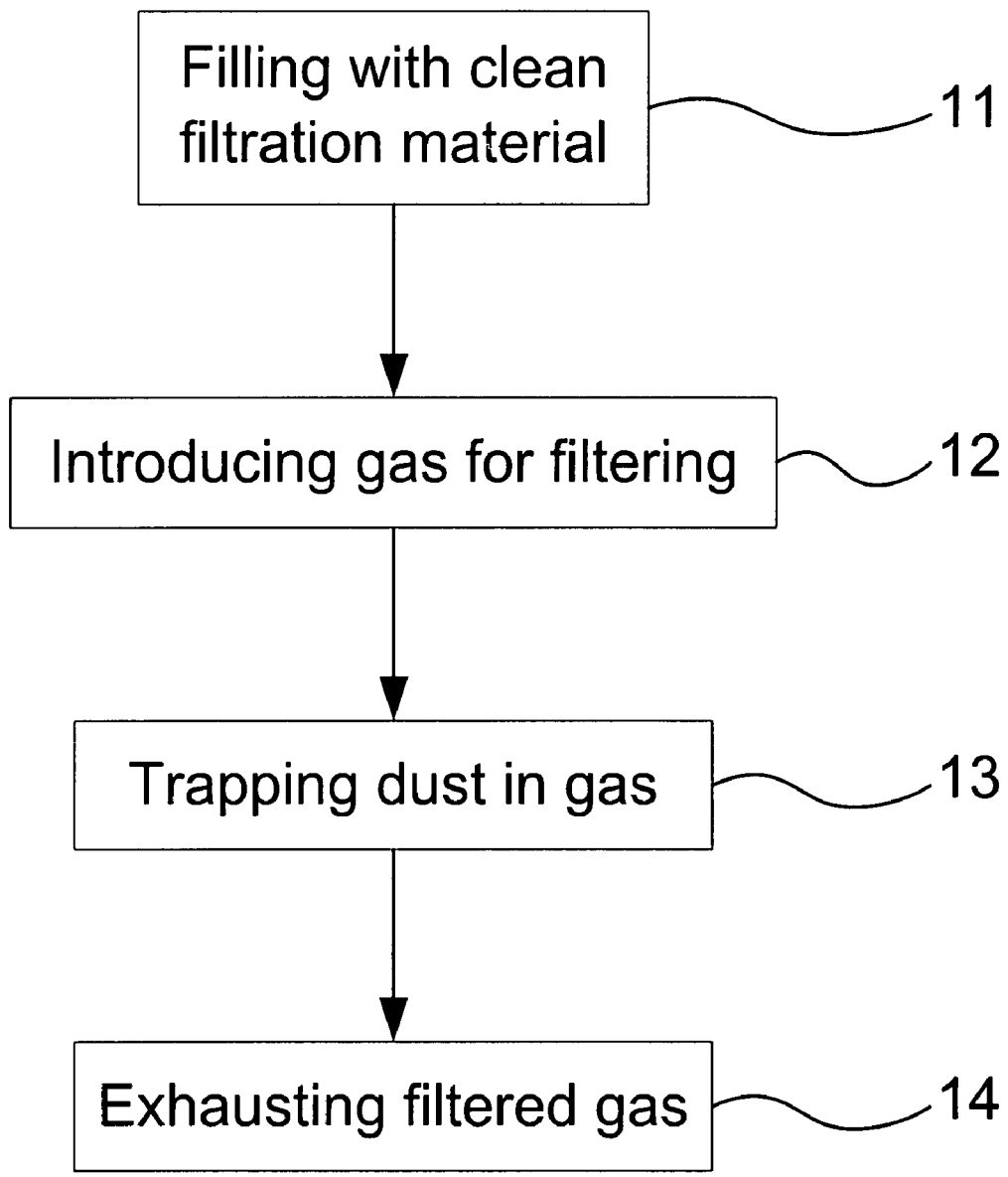

Please refer to FIG. 1, which is a flow view showing a preferred embodiment according to the present invention. As shown in the figure, the present invention is an adjustable dual-blade dust filter using a granular bed flow, comprising a filtration material inlet [26], at least one gas intake blade [22], at least one gas intake sub-blade [23], at least one gas exhaust blade [28], at least to one gas exhaust sub-blade [29] and a filtration material outlet [27], where a vertically-aligned funnel structure having a wider upper mouth is formed by the gas intake blade [22] and the gas exhaust blade [28] to be flowed with a granular bed material; in the funnel structure, the gas intake sub-blade [23] and the corresponding gas exhaust sub-blade [29] forms a passage having a wider upper end; and a plurality of flow fields are formed in the funnel structure. Thus, a novel adjustable dual-blade dust filter using a granular bed flow is obtained for filtering dust in a contaminated gas most efficiently.

The following steps are comprised in filtering the dust in the contaminated gas:

(a) Filling with a clean filtration material [11]: A clean filtration material [24] is put in from the filtration material inlet [26] to fill a placement space of the dust filter, where the placement space is fully utilized.

(b) Introducing a gas for filtering [12]: A gas for filtering [21] is introduced from the left side of the present invention to the right side, where the gas for filtering [21] is produced by an outside exhaust smoke generator (not shown in the figures) with a flowing energy thus added; and the flowing direction of the gas for filtering [21] is perpendicular to the flowing direction of the filtration material [24].

(c) Trapping dust in the gas [13]: When the gas for filtering [21] is introduced from the gas intake blade [22] at the left side of the present invention to the gas exhaust blade [22] at the right side, the gas for filtering [21] is collided with the clean filtration material [24] for trapping the dust in the gas for filtering [21] by the filtration material [24].

(d) Exhausting a filtered gas [14]: A filtered gas [25] is exhausted through the gas exhaust sub-blade [29] and the gas exhaust blade [28], while the trapped dust is carried out together with the filtration material [24] from the filtration material outlet [27]. Meanwhile, the filtration material is not obstructed in the placement space.

Figure 2:
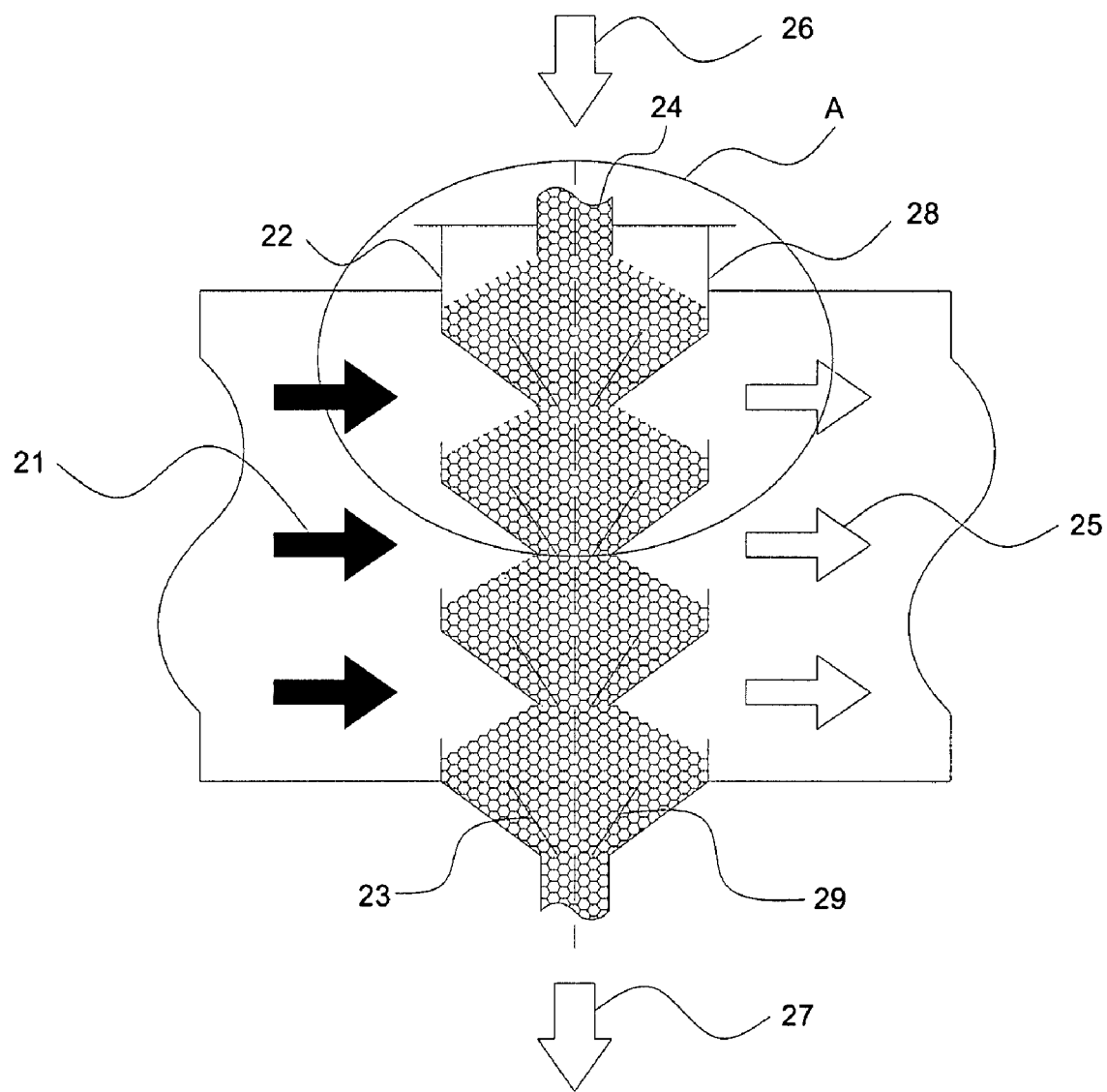
FIG. 2 is the sectional view showing the dust filter.
Figure 3:
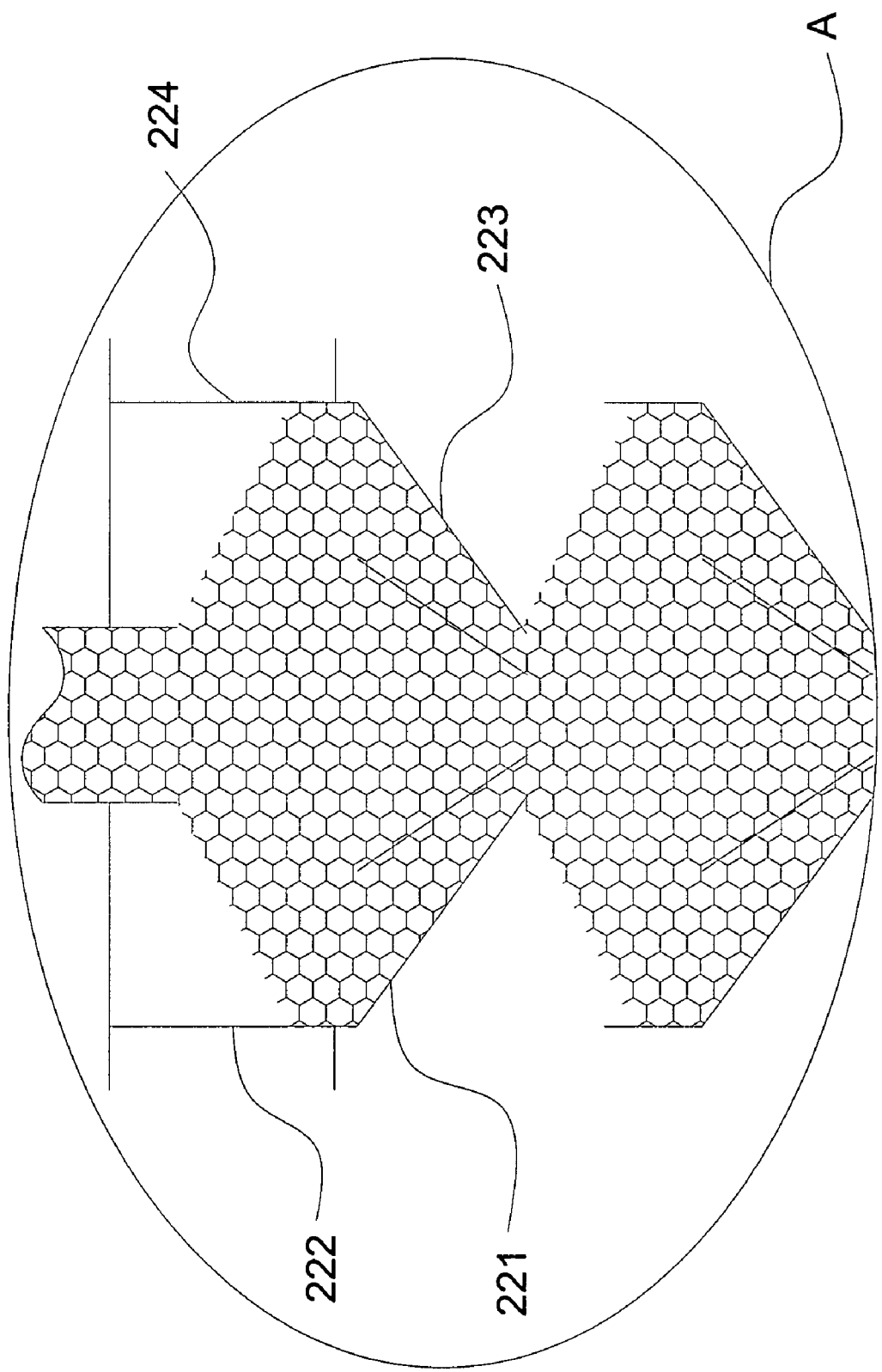
FIG. 3 is the view showing the area A in FIG. 2.

Please refer to FIG. 3, which is a view showing area A in FIG. 2. As shown in the figure, a gas intake blade [22] comprises a gas-intake-side guiding plate [221] and a gas-intake-side vertical plate [222], where the gas-intake-side vertical plate [222] is deposed on the gas-intake-side guiding plate [221]; and, a corresponding gas exhaust blade [28] comprises a gas-exhaust-side guiding plate [223] and a gas-exhaust-side vertical plate [224], where the gas-exhaust-side vertical plate [224] is deposed on the gas-exhaust-side guiding plate [223].

Figure 4:
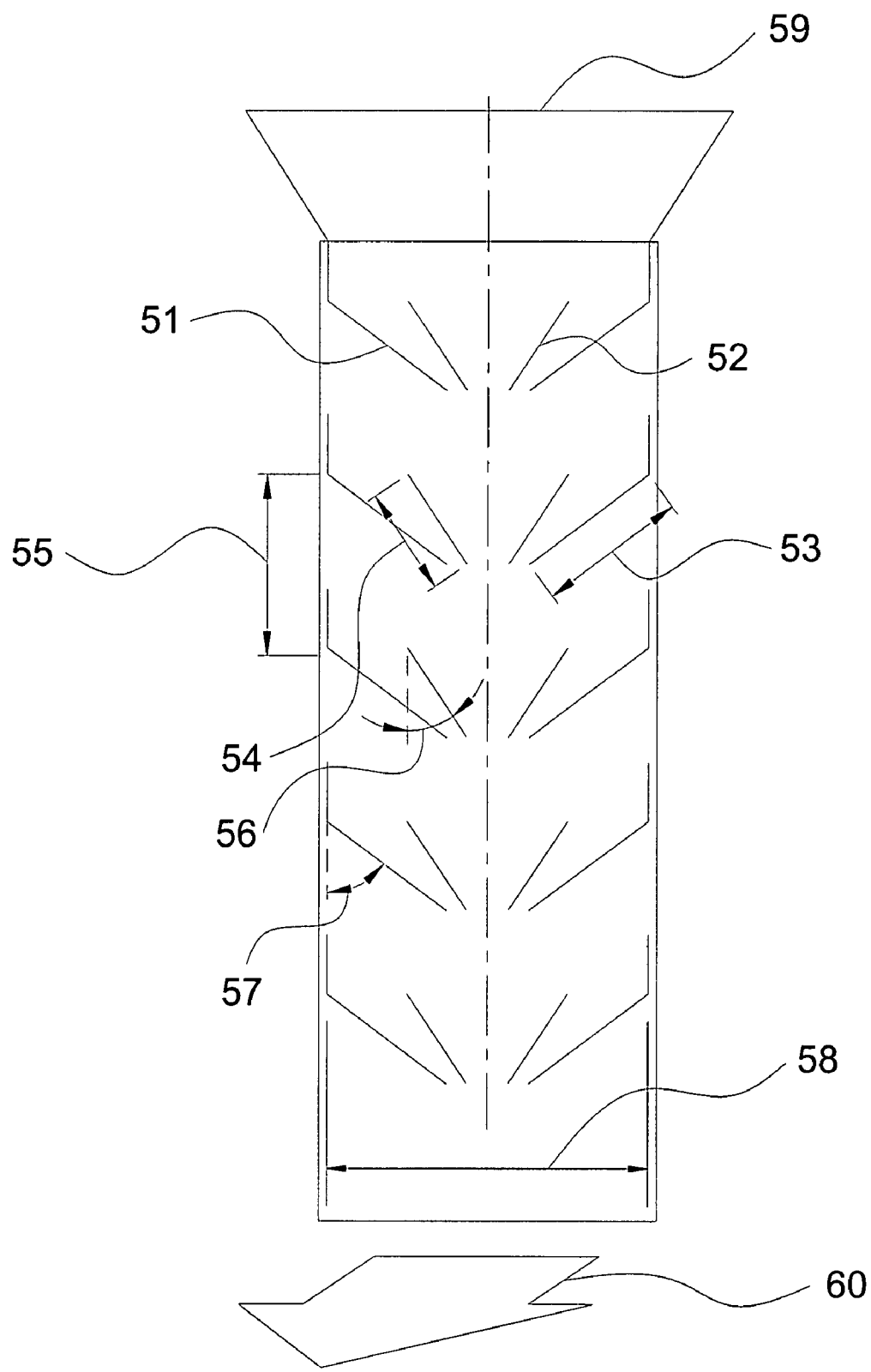
FIG. 4 is the view showing the placement of the flow corrective unit.

Please refer to FIG. 4, which is a view showing a placement of a flow corrective unit. As shown in the figure, on one hand, the present invention fills a placement space with a filtration material to fully utilize the placement space for a better filtering efficiency. On the other hand, a dust filter according to the present invention obtains a plurality of flow fields to be utilized separately, where the flow fields are formed among blades [51] at two sides and sub-blades [52] between the blades [51].

The present invention has fixed values for a filter width [58], a blade length [53] and a blade angle [57]; and has adjustable values for a blade distance [55], a sub-blade length [54] and a sub-blade angle [56]. The present invention emphasizes a stable flow of the filtration material; so, a hopper [59], the flow fields, a flow corrective unit of the blades [51] and the sub-blades [52], and a belt conveyer [60] have to keep axi-symmetrical. In addition, the belt conveyer [60] has to keep a horizontal transportation with a homogenous strain to stabilize the filtration material for obtaining a good photographic analysis later.

Please refer to FIG. 5A to FIG. 5G and FIG. 6, which are views showing assemblies of dust filters and a view showing parameters of the dust filters. As shown in the figures, a filtration material in a granular bed filter according to the present invention comprises 95 presents (%) of silicon dioxide and 5% of the other components, which has a granular size about 2 to 4 millimeters (mm) and a bulk density (pb) of 1.5 grams per square centimeter ($g/cm^3$). A blade distance, a sub-blade length and a sub-blade angle are set for analyzing flows of the filtration material with fixed values of a filter width, a blade length and a blade angle.

The filter width of the present invention is 380 mm [71]; the blade length is 218 mm [72]; and, the blade angle is 40° [73]. These values are fixed. However, the blade distance is selected for comparisons from 260 millimeters (mm), 340 mm and 520 mm coordinated with changes in the sub-blade length and the sub-blade angle.

Figure 5A:
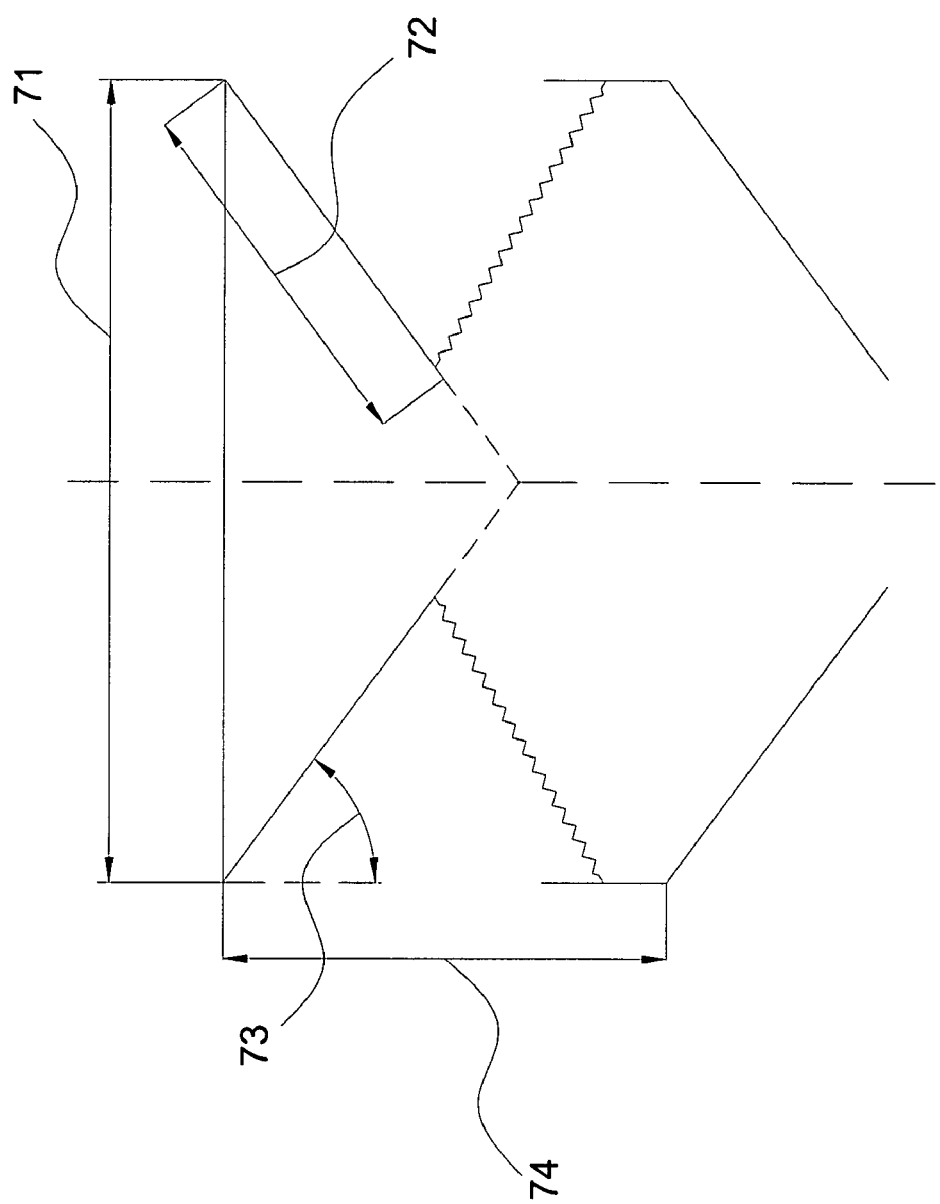
FIG. 5A to FIG. 5G are the views showing the assemblies of the dust filters.
Figure 5B:
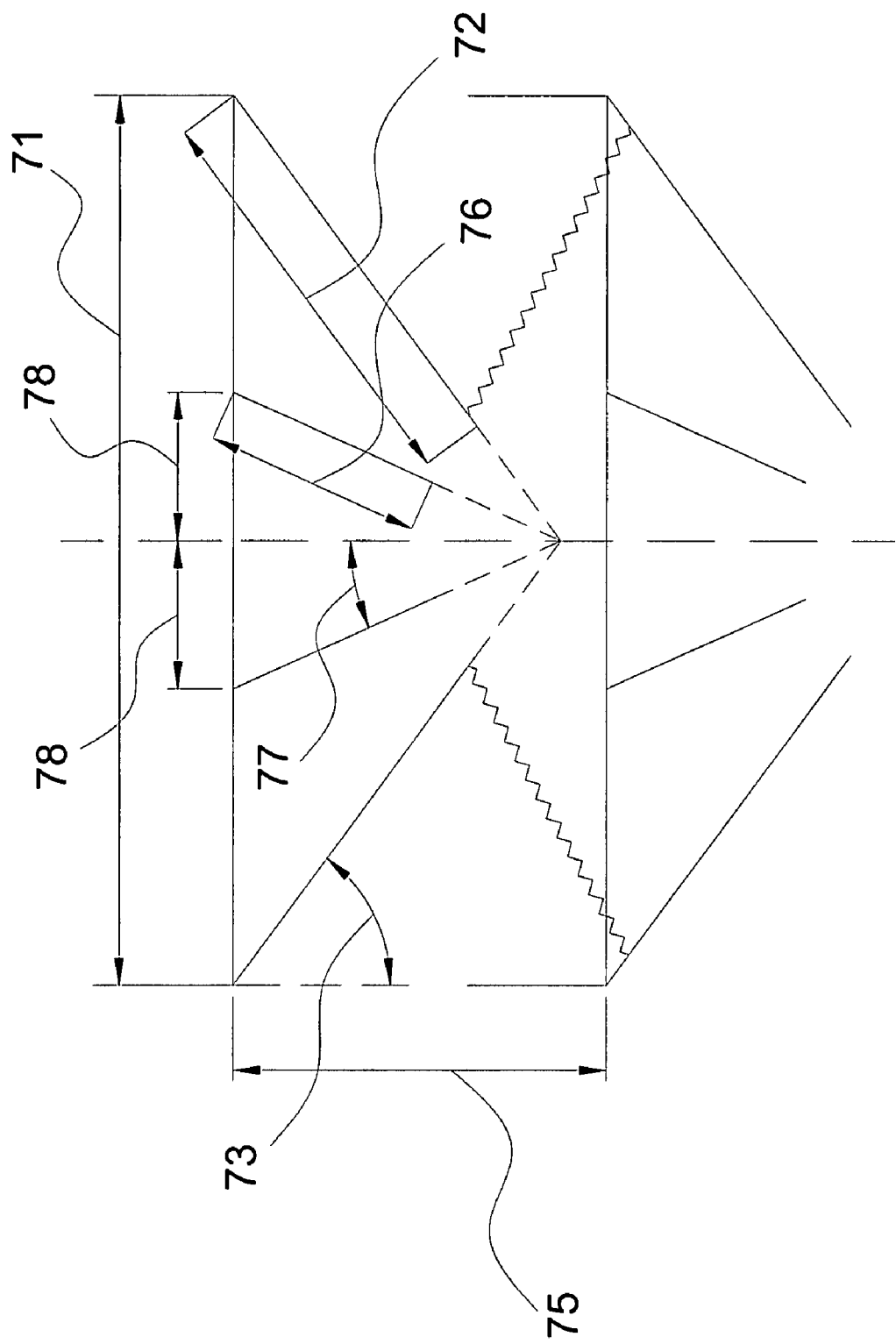
Figure 5C:
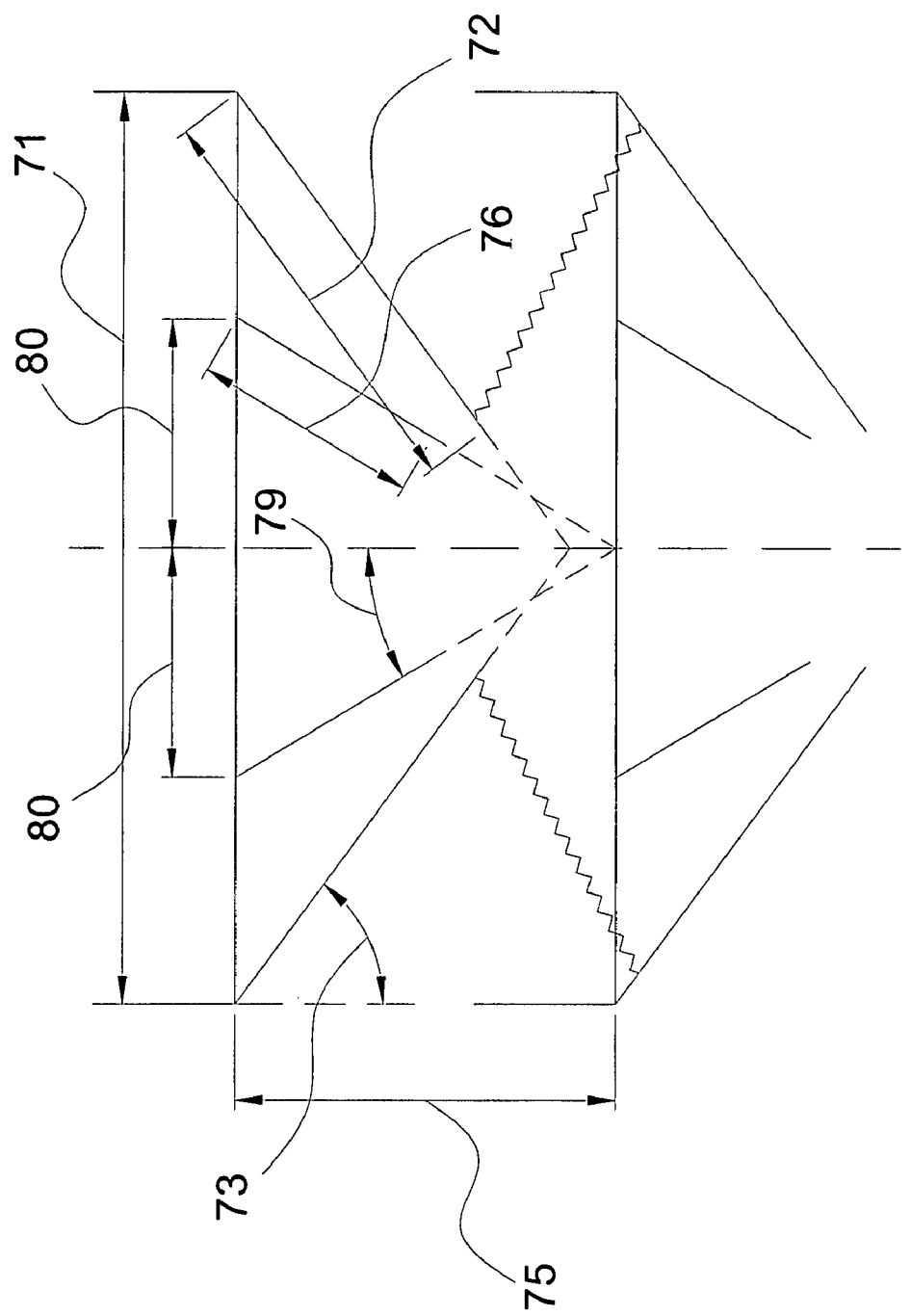
Figure 5D:
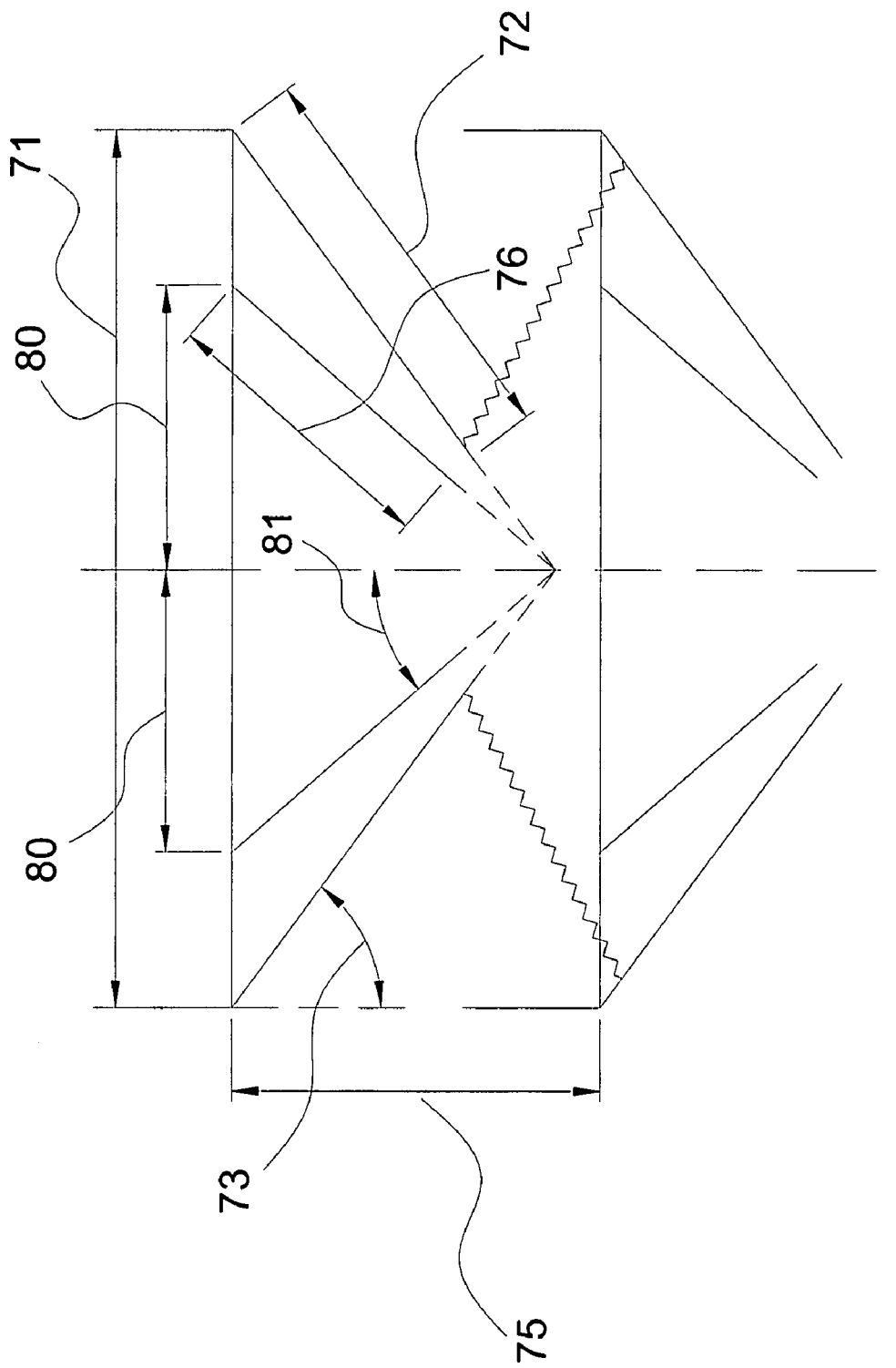
Figure 5E:
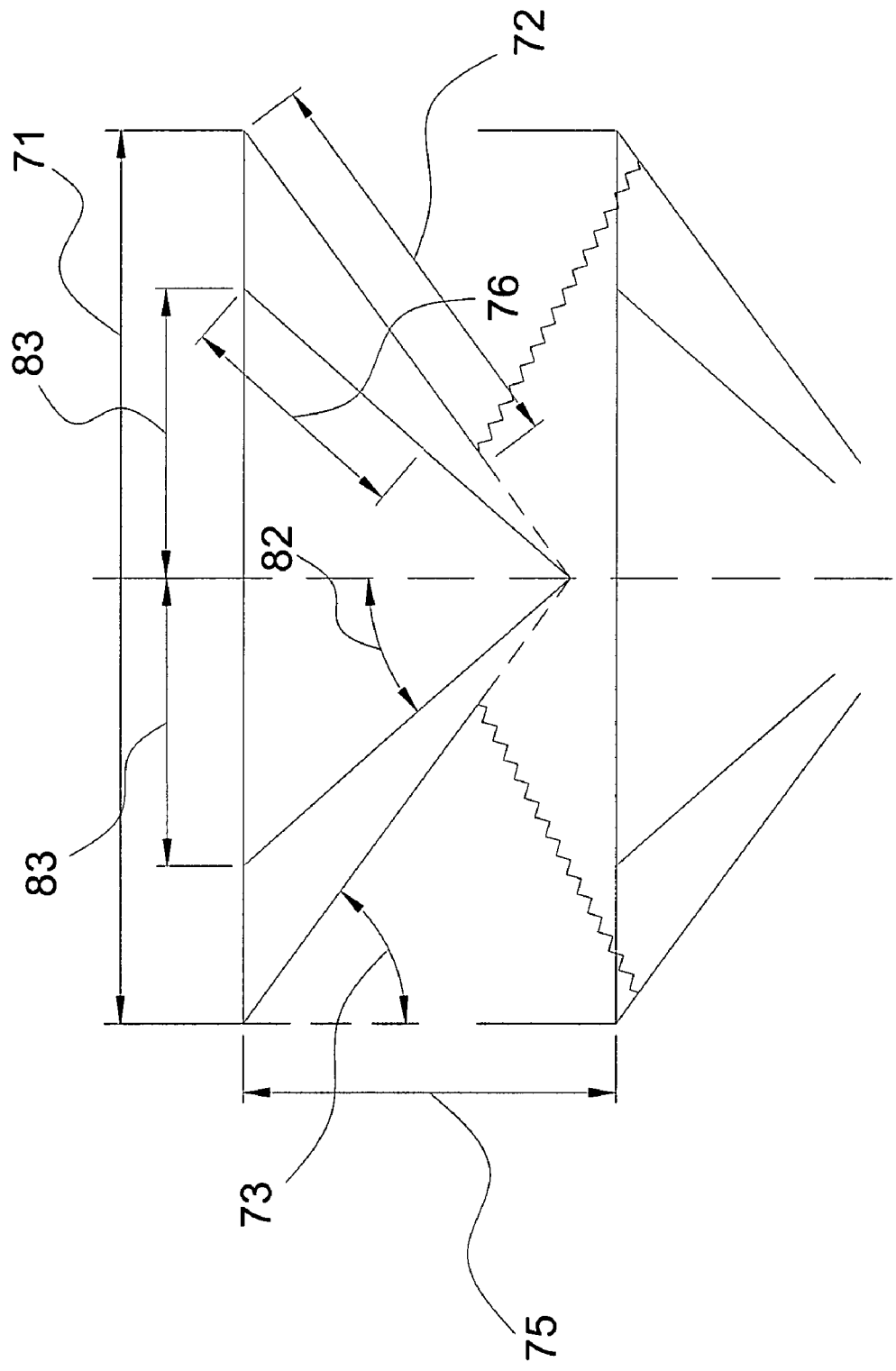
Figure 5F:
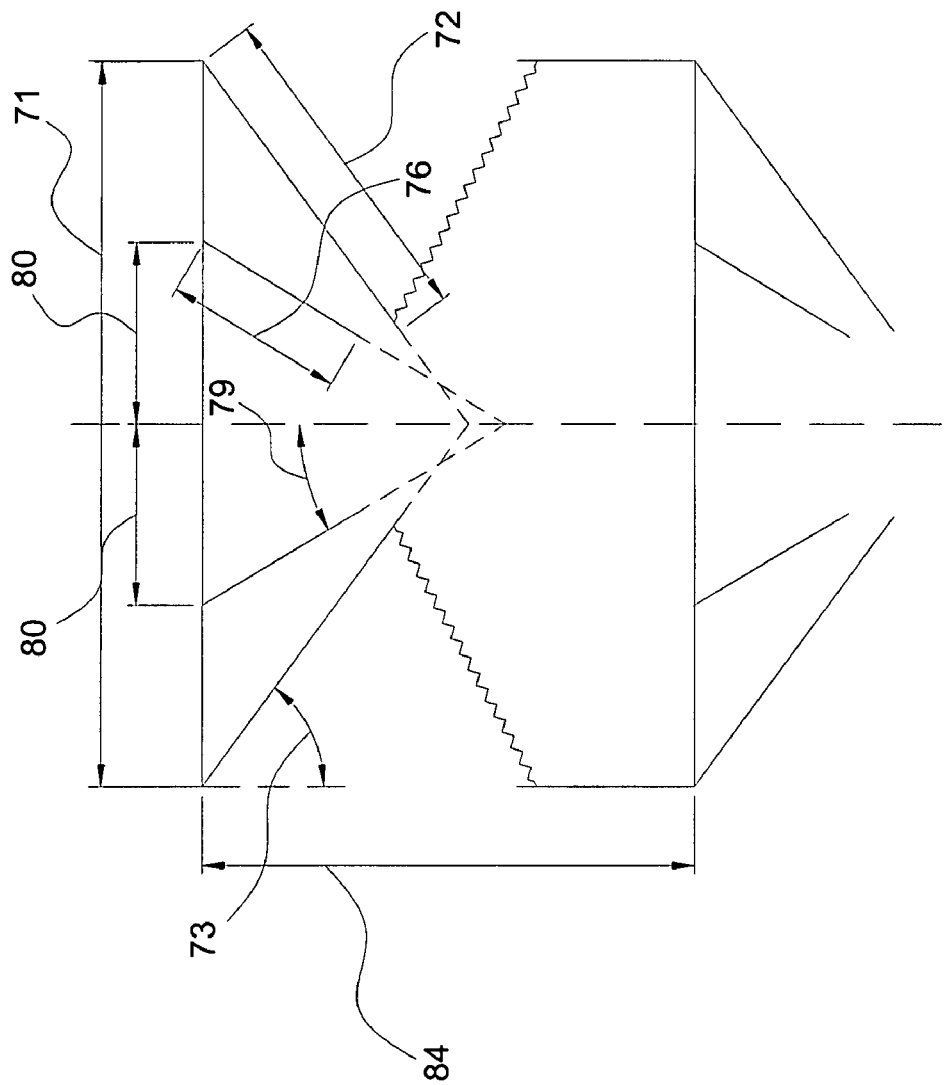
Figure 5G:
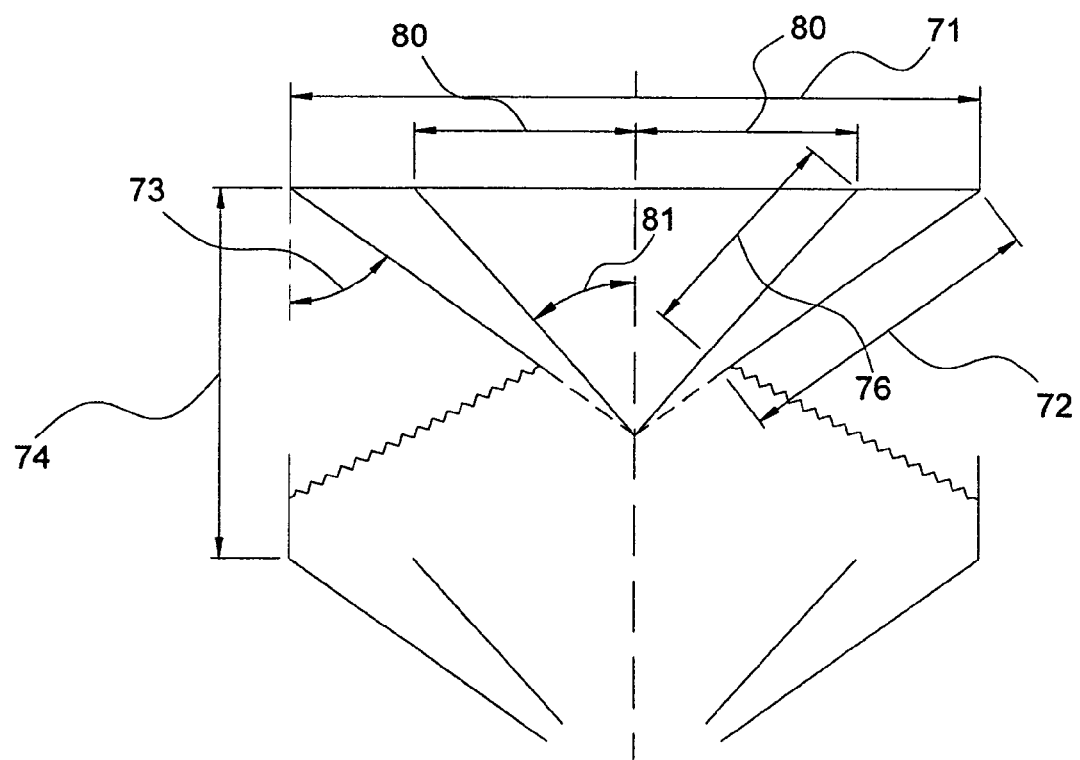
Figure 7:
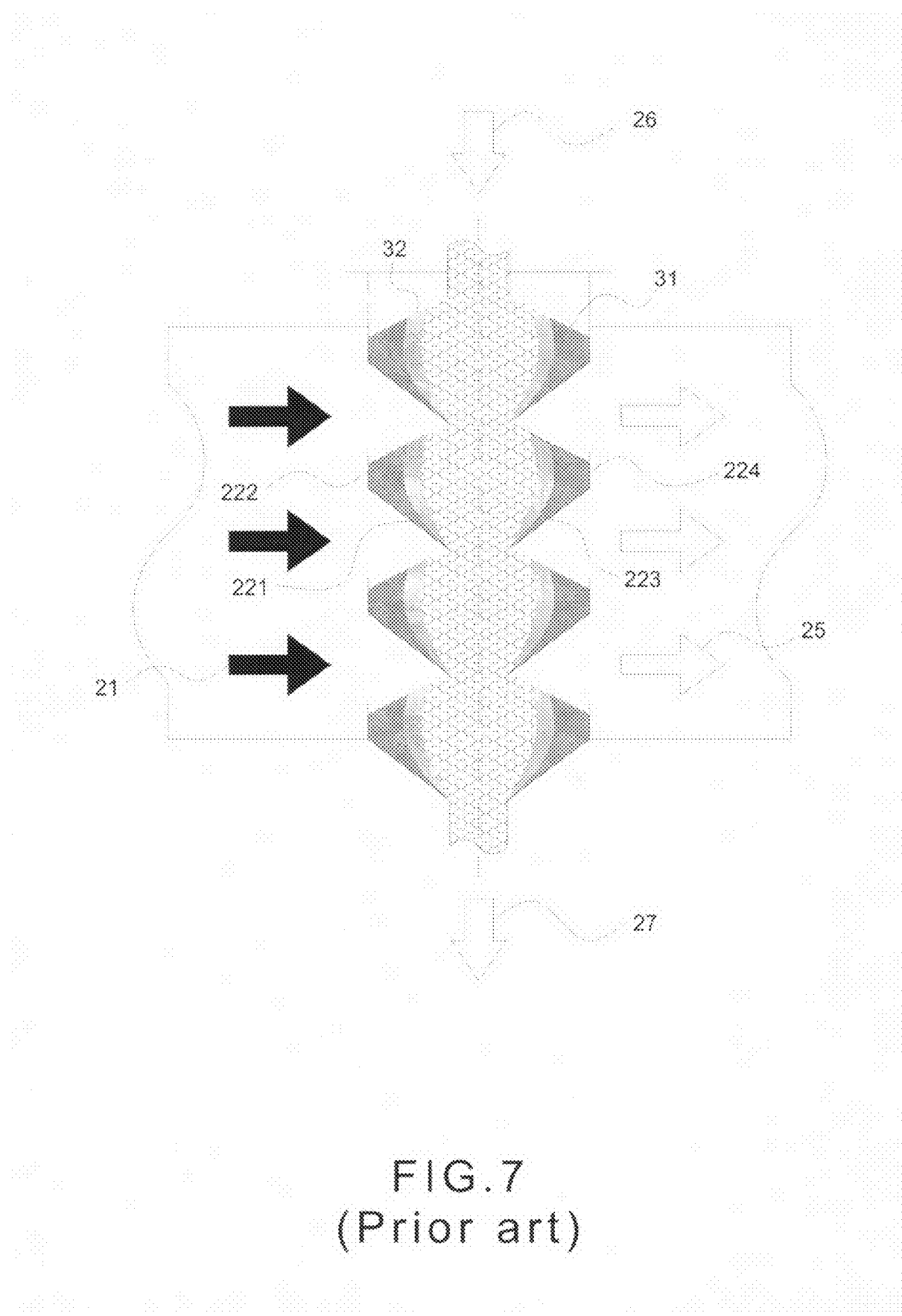
FIG. 7 is the view of the obstruct prior art.

FIG. 5A, having no sub-blade, is used as a base for the comparisons. FIG. 5B has a blade distance of 260 mm [75], a sub-blade width of 82 mm [78], a sub-blade length of 160 mm [76] and a sub-blade angle of 20° [77]. FIG. 5C to FIG. 5G have assemblies like the assembly shown in FIG. 5B yet with different sub-blade widths and angles, where the sub-blade angles are 22° [79], 25° [81] and 30° [82] and the sub-blade widths are 105 mm [80] and 130 mm [83]. FIG. 5F has a blade distance of 520 mm [84] and a sub-blade angle of 22° [79]. And FIG. 5G has a sub-blade angle of 25° [81] and a blade distance back to 340 mm [74].

Regarding the above assemblies of dust filters, parameters of the assemblies comprises lengths, distances, angles and positions of the blades and the sub-blades, which forms flow corrective units. In these assemblies with these parameters, a best assembly is selected to obtain a best flow of a filtration material in a granular bed. In another word, the present invention mainly varies on a blade distance and a sub-blade angle to form various effects on removing an obstruction area of the filtration material. For example, the assemblies in FIG. 5C and FIG. 5D have the same positions for sub-blades yet with different angles; and, the assemblies in FIG. 5C and FIG. 5F have the same positions and angles for sub-blades yet with different blade distances.

Moreover, the dust filter according to the present invention has an adjusting method, comprising the following steps:

(a) An intake velocity of a gas entered from the gas intake blade is controlled to a stable status.

(b) The granular bed material entered from the filtration material inlet is controlled to obtain a required mass flow rate;

(c) An intake density of a contaminant for filtering is controlled to a stable status.

(d) And, a density of the contaminant at the filtration material outlet is measured to obtain a filtration efficiency.

The present invention analyzes flow field velocity concerning continuous changes in the flow fields, velocity field affected by the flow corrective unit, and effect on removing stagnation area of the filtration material. By doing so, relationships between various flow corrective units and corresponding flow fields are acquired; and related velocities for positions in flow fields are obtained. Thus, comparisons concerning velocities in flow fields are done to find a design with the best efficiency on removing the stagnation area of the filtration material.

To sum up, the present invention is an adjustable dual-blade dust filter using a granular bed flow, where efficiency on filtering and exhausting dust in gas is improved through a best design of flow corrective unit with blades to obtain a best flow of filtration material; and a stagnation area of filtration material on blades is removed.

The preferred embodiment herein disclosed is not intended to unnecessarily limit the scope of the invention. Therefore, simple modifications or variations belonging to the equivalent of the scope of the claims and the instructions disclosed herein for a patent are all within the cope of the present invention.

What is claimed is:

1. An adjustable dual-blade dust filter using a granular bed flow, comprising:

a filtration material inlet;

at least one gas intake blade, said gas intake blade being located at a side of said dust filter and at a fixed angle with respect thereto, said gas intake blade comprising a gas-intake-side guiding plate and a gas-intake-side vertical plate, said gas-intake-side vertical plate being deposed on said gas-intake-side guiding plate;

at least one gas intake sub-blade, said gas intake sub-blade being located at the same side as said gas intake blade, said gas intake sub-blade being tilted at the same direction as said gas-intake-side guiding plate;

at least one gas exhaust blade;

said gas exhaust blade being corresponding to said gas intake blade respectively, said gas exhaust blade being located at another side of said dust filter and at a fixed angle with respect thereto, said gas exhaust blade comprising a gas-exhaust-side guiding plate and a gas-exhaust-side vertical plate, said gas-exhaust-side vertical plate being deposed on said gas-exhaust-side guiding plate;

at least one gas exhaust sub-blade said gas exhaust sub-blade being corresponding to said gas intake sub-blade respectively, said gas exhaust sub-blade being located at the same side as said gas exhaust blade, said gas exhaust sub-blade being tilted at the same direction as said gas-exhaust-side guiding plate; and a filtration material outlet, wherein a granular bed material is flowed through said gas intake blade, said gas intake sub-blade, said gas exhaust blade and said gas exhaust sub-blade;

wherein a vertically-aligned funnel structure is obtained by said gas intake blade and said corresponding gas exhaust blade to be flowed with said granular bed material, and said funnel structure has a wider mouth at a direction toward said filtration material inlet;

wherein, in said funnel structure, said gas intake sub-blade and said corresponding gas exhaust sub-blade are positioned to obtain a passage having a wider mouth at a direction toward said filtration material inlet; and wherein said funnel structure has a plurality of flow fields formed between said gas intake blade and said corresponding gas exhaust blade by said gas intake sub-blade and said corresponding gas exhaust sub-blade, wherein the gas intake sub-blade and the gas exhaust sub-blade of the adjustable dual-blade dust filter are adjustable away from parallel to the at least one gas intake and gas exhaust blades.

2. The dust filter according to claim 1 wherein said gas intake sub-blade has an angle between 0 and 90 degrees)(°).

3. The dust filter according to claim 1, wherein said gas exhaust sub-blade has an angle between 0° and 90°.

* * * * *